US012477362B2

(12) United States Patent
Roessler et al.

(10) Patent No.: US 12,477,362 B2
(45) Date of Patent: Nov. 18, 2025

(54) SYSTEMS AND METHODS FOR GENERATING SYNTHETIC WIRELESS CHANNEL DATA

(71) Applicant: Rohde & Schwarz GmbH & Co. KG, Munich (DE)

(72) Inventors: Andreas Roessler, Columbia, MD (US); Timo Mayer, Munich (DE); Christopher Rosanka, Hoehenkirchen-Siegertsbrunn (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 410 days.

(21) Appl. No.: 17/983,981

(22) Filed: Nov. 9, 2022

(65) Prior Publication Data
US 2023/0156493 A1 May 18, 2023

Related U.S. Application Data

(60) Provisional application No. 63/279,383, filed on Nov. 15, 2021.

(51) Int. Cl.
*H04W 24/06* (2009.01)
*H04B 17/00* (2015.01)

(52) U.S. Cl.
CPC ........ *H04W 24/06* (2013.01); *H04B 17/0087* (2013.01)

(58) Field of Classification Search
CPC . G06F 11/3082; G06F 11/3089; G06N 3/006; G06N 3/044; G06N 3/045; G06N 3/047; G06N 3/048; G06N 3/08; G06N 3/084; G06N 3/088; G06N 3/126; H04B 17/0087; H04B 17/391; H04B 17/3912; H04B 17/3913; H04L 5/0005; H04L 1/0006; H04L 1/0026; H04L 41/145; H04W 16/22; H04W 24/06; H04W 56/0035; H04W 72/0453
See application file for complete search history.

(56) References Cited

U.S. PATENT DOCUMENTS

| | | | |
|---|---|---|---|
| 11,586,915 B2 * | 2/2023 | Macready | G06N 3/045 |
| 11,948,075 B2 * | 4/2024 | Kavukcuoglu | H03M 7/3082 |
| 2019/0274108 A1 * | 9/2019 | O'Shea | H04B 17/3912 |
| 2021/0241074 A1 | 8/2021 | Mayer et al. | |

(Continued)

FOREIGN PATENT DOCUMENTS

EP 3 460 725 A1 3/2019

*Primary Examiner* — Frank Duong
(74) *Attorney, Agent, or Firm* — DITTHAVONG, STEINER & MLOTKOWSKI (57) ABSTRACT

The present disclosure relates to a method for generating synthetic wireless channel data, comprising: proving wireless channel data in a latent space, wherein the wireless channel data comprises a plurality of datasets, wherein each dataset represents channel characteristics of a wireless communication channel and comprises a plurality of channel attributes; receiving a user input which defines at least one channel attribute; mutating the wireless channel data, wherein during said mutation only channel attributes of wireless channel data other than the at least one channel attribute defined by the user input are allowed to mutate; and generating synthetic wireless channel data based on the mutated wireless channel data in latent space.

26 Claims, 6 Drawing Sheets

(56) References Cited

U.S. PATENT DOCUMENTS

2021/0241075 A1     8/2021   Mayer et al.
2022/0035346 A1*   2/2022   Mercangoez .......... G05B 17/02
2022/0060917 A1*   2/2022   Vitthaladevuni ........ G06N 3/08
2024/0202542 A1*   6/2024   Lindbom ............... G06N 3/045

* cited by examiner

SYSTEMS AND METHODS FOR GENERATING SYNTHETIC WIRELESS CHANNEL DATA

TECHNICAL FIELD

The disclosure relates to the generation of synthetic data, in particular by means of neural networks or artificial intelligence systems. More specifically, the disclosure relates to systems and methods for generating synthetic channel data of wireless communication channels.

INTRODUCTION

New measurement and communication equipment is often tested before its implementation to evaluate the behavior and performance of the equipment. Such tests can be performed with data and/or signals that are provided in the form of test sets or simulation sets. Such data and/or signals can be fed to the equipment or used in a test system for testing the equipment.

The test and simulation sets are typically based on measurement data that was recorded by real world measurements or comprise such data, for example real world measurements of wireless communication channels. However, often only a limited number of measured data, for instance only measurements in a limited number of frequency bands, is available.

SUMMARY

Thus, there is a need to provide improved methods and systems for generating synthetic wireless channel data.

According to a first aspect, the present disclosure relates to a method for generating synthetic wireless channel data, wherein the method comprises the steps of:
  providing wireless channel data in a latent space, wherein the wireless channel data comprises a plurality of datasets, wherein each dataset represents channel characteristics of a wireless communication channel and comprises a plurality of channel attributes;
  receiving a user input defining mutation parameters (mutation constraints);
  mutating the wireless channel data, wherein during said mutation the user input is used as a mutation parameter, e.g. the user input defines at least one attribute which should be boosted, dampened or "frozen" (i.e. not allowed to mutate) during the mutation, and
  generating synthetic wireless channel data based on the mutated wireless channel data in latent space.

In an example, preferably only channel attributes of wireless channel data other than the at least one channel attribute defined by the user input are allowed to mutate.

According to a second aspect, the present disclosure relates to a system for generating synthetic wireless channel data, wherein the system comprises means for proving wireless channel data in a latent space, wherein the wireless channel data comprises a plurality of datasets, wherein each dataset represents channel characteristics of a wireless communication channel and comprises a plurality of channel attributes;
  an interface configured to receive a user input; a processing unit mutating the wireless channel data wherein the user input is used as a mutation parameter, e.g. the user input defines at least one attribute which should be boosted, dampened or "frozen" (i.e. not allowed to mutate) during the mutation,
  (In an example only channel attributes of wireless channel data other than the at least one channel attribute defined by the user input are allowed to mutate; wherein the processing unit is configured to generate synthetic wireless channel data based on the mutated wireless channel data in latent space.

The synthetic wireless channel data generated by the above system and/or method can be used for real word applications. For example, RF signals can be generated based on the synthetic wireless channel data. These RF signals (e.g., millimeter wave signals) can have characteristics of real word signals and can, e.g., be used to test a device under test, e.g., a mobile telecommunication device or a base station.

By only allowing channel attributes other than the inputted channel attribute to mutate, certain constraints can be imposed on the synthetic wireless channel data (and on any RF signal generated based on the synthetic wireless channel data). For example, the inputted channel attribute can be a frequency band, such that the generated channel data (and the RF signal) is limited to data within said frequency band. Such a frequency band could be a 0.7 GHZ, 2 GHZ, 3.5 GHZ, 6 GHZ, 28 GHz or 60 GHz band. The frequency band can be a millimeter wave band.

In particular, the channel attribute defined by the user input is fulfilled by the generated synthetic wireless channel data. I.e., the generated synthetic wireless channel data represents a wireless communication channel with said channel attribute.

In particular, the wireless channel data is mutated in latent space. The representation of the wireless channel data in the latent space can be performed using a disentanglement algorithm. According to https://deepai.org/machine-learning-glossary-and-terms/disentangled-representation-learning "disentangled representation" is an unsupervised learning technique that breaks down, or disentangles, each feature into narrowly defined variables and encodes them as separate dimensions.

Latent space may refer to a compressed representation of digital data which was, e.g., generated by an encoder neural network. Latent space data (compressed representation) can comprise latent variable data and/or encoded data.

The generated synthetic wireless channel data preferably comprises channel attributes of physical characteristics of a wireless communication channel, in particular a 3G, 4G, 5G or 6G channel. The synthetic wireless channel data can be used to simulate a real world wireless communication channel.

In the following, further optional aspects of the method according to the first aspect of the disclosure and the system according to the second aspect of the disclosure are provided:

The user input can comprise and/or define a sequence of channel attributes.

The synthetic wireless channel data can be generated based on a neural network algorithm executed by a trainable neural network. The trainable neural network can comprise an encoder and a decoder neural network. The system can comprise the trainable neural network. For example, the neural network can form a Generative Adversarial Network (GAN).

The neural network algorithm can be trained with training data which comprises channel data and channel attribute data.

The training of the neural network algorithm may at least comprise the use of an encoder neural network transforming an inputted dataset to latent space data.

For example, the training of the neural network algorithm contains at least a step of: identifying channel attributes in the latent space data in relation to channel attributes of the training data and/or inputted channel attribute data.

In particular, the training of the neural network algorithm contains the identification of at least one channel attribute in the latent space data representing a channel attribute of the training data and/or the inputted channel attribute data.

The method can comprise the further step of: detecting channel attributes in the wireless channel data. Analogously, the processor of the system can be configured to detect channel attributes in the wireless channel data.

The wireless channel data can be mutated in latent space by manipulating or weighting at least one detected channel attribute in the wireless channel data based on the at least one channel attribute defined by the user input.

The manipulated or weighted latent space data can be fed to a decoder neural network configured to generate the synthetic channel data based on the manipulated or weighted wireless channel data. The decoder neural network can be a component of the neural network that is comprised by the system.

The at least one attribute defined by the user input is at least one of: frequency band, outdoor or indoor location, UMi/UMa, NLOS/LOS (non-line-of-sight/line-of-sight), static mobility, doppler frequency, velocity, humidity, temperature, interference, rain information, jammer, spoofer, position data, environment data.

In particular, the at least one attribute defined by the user input comprises geographical positions of two communication nodes within a wireless communication channel.

The generating synthetic wireless channel data can be encrypted.

The user input can be received from another device, such as a receiver, a signal analyzer, or a spectrum analyzer.

The user input can be received on a user interface, in particular graphical user interface, for receiving the user input from a user. The user interface can comprise a slide controller, e.g. a virtual slide controller which is displayed in a graphical user interface.

The user input can further be provided via an interface that is connected to a communication network, in particular the internet.

The user input can be provided from a server via the communication network.

The generated synthetic channel data can be downloadable via the communication network.

According to a third aspect, the present disclosure relates to a system for generating synthetic wireless channel data, comprising: a database configured to store a plurality of wireless channel datasets and/or an artificial intelligence unit trained with such wireless channel datasets, a user interface configured to receive user input geographically defining the wireless channel (e.g. by defining at least one geographic positions), and a processing unit configured to synthesize estimated channel characteristics of the thus geographically defined wireless communication channel (e.g. between two geographic locations) either based on the datasets stored in the database or by inputting the at least two geographic positions into the artificial intelligence unit, wherein the system is configured to output a synthetic wireless channel dataset which comprises channel attributes of physical characteristics of a wireless communication channel.

According to a fourth aspect, the present disclosure relates to a method, in particular a channel simulation method, for generating synthetic wireless channel data, comprising:

storing a plurality of wireless channel datasets in a database, and/or training an artificial intelligence unit with such wireless channel datasets;

receiving user input defining geographically a wireless channel, synthesizing estimated channel characteristics of a wireless communication channel between the thus geographically defined wireless channel either based on the datasets stored in the database or by inputting the geographic definition of the wireless channel into the artificial intelligence unit, outputting a synthetic wireless channel dataset which comprises channel attributes of physical characteristics of a wireless communication channel.

The synthetic wireless channel dataset can be used for a virtual planning, e.g., to improve the planning of infrastructure, such as radio towers. The planning can provide information about range and signal strength of wireless radio networks. For example, the synthetic wireless channel dataset allows to take into account the influence of new buildings, plantings or geographical features when planning radio infrastructure and allows for a position-optimized installation of infrastructure.

In the following, further optional aspects of the system according to the third aspect of the disclosure and the method according to the fourth aspect of the disclosure are provided:

The processing unit can be configured to generate the synthetic wireless channel datasets at least partially based on the estimated channel characteristics.

For example, the processing unit is configured to estimate physical objects within an area of interest between the at least two geographic positions based on geo location information, wherein the processor is configured to take said physical objects into account when synthesizing the estimated channel characteristics. E.g. data can be extracted from 3d digital charts.

Said geolocation information can be stored in the database and/or provided by the artificial intelligence unit.

The processing unit can be configured to calculate the area of interest at least partially based on manually input geographic data, such as height, width, or Fresnel zone.

A Fresnel zone is an elliptically shaped region between a transmitter and receiver. Reflections from obstacles in this region can influence the useful signal by cancellation or distort it by superimposition. The processing unit can, for instance, calculate the area of interest based on the Fresnel zone between the at least two geographic positions.

The information on the physical objects can be generated with a trained algorithm, which can be executed by the artificial intelligence unit. The generated information can be stored in the database.

The algorithm can be trained with the use of measured channel data, for example comprising position information and/or map data.

The artificial intelligence unit can comprise a trainable neural network, which can be configured to use at least parts of the measured channel data, in particular at least parts of the map data, for training.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTIONS OF EMBODIMENTS

Figure 1:
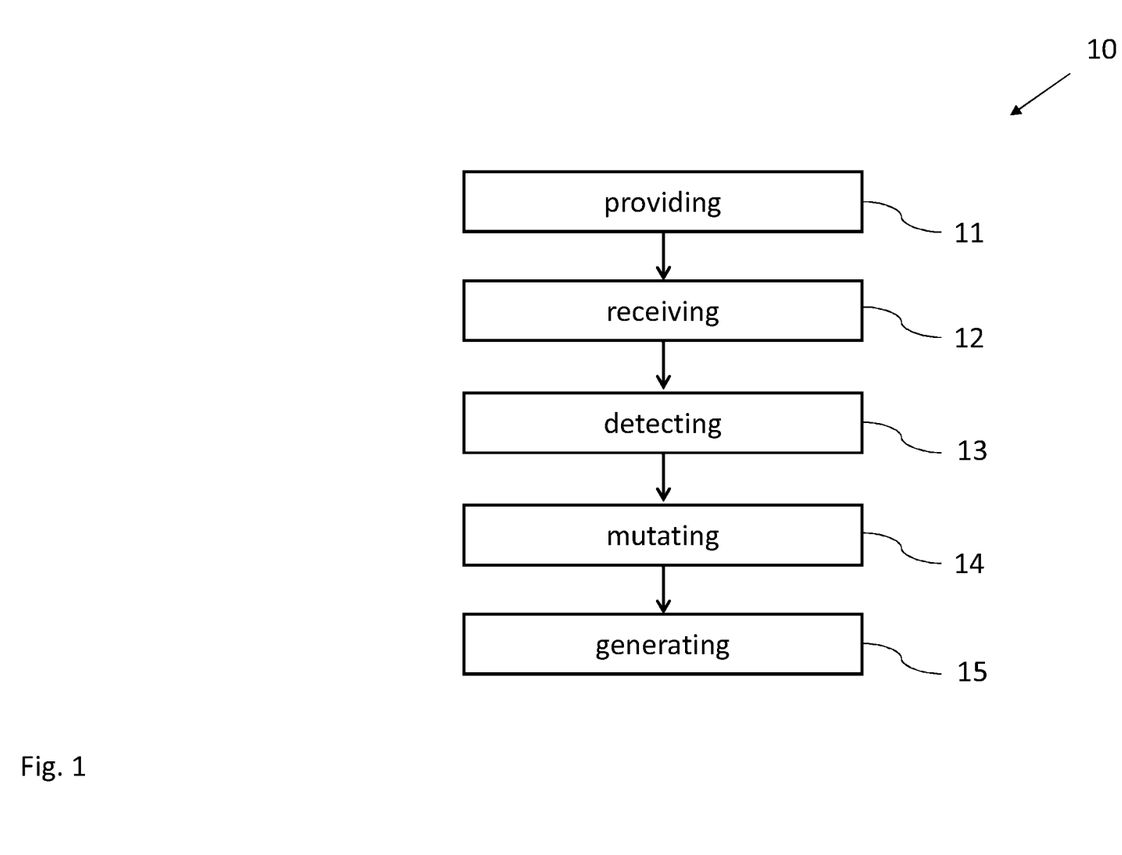
FIG. 1 shows a flow chart of a method for generating synthetic wireless channel data according to an embodiment.

FIG. 1 shows a flow chart of a method 10 for generating synthetic wireless channel data according to an embodiment.

The method 10 comprises the steps of:
proving 11 wireless channel data in a latent space, wherein the wireless channel data comprises a plurality of datasets, wherein each dataset represents channel characteristics of a wireless communication channel and comprises a plurality of channel attributes;

receiving 12 a user input defining mutation parameters, wherein during said mutation the user input is used as a mutation parameter, e.g. the user input defines at least one attribute which should be boosted, dampened or "frozen" (i.e. not allowed to mutate) during the mutation, and generating 15 synthetic wireless channel data based on the mutated wireless channel data in latent space.

In an example, preferably only channel attributes of wireless channel data other than the at least one channel attribute defined by the user input are allowed to mutate.

The wireless channel data can be mutated 14 in latent space. In particular, the wireless channel data is mutated 14 in latent space by manipulating or weighting at least one detected channel attribute in the wireless channel data based on the at least one channel attribute defined by the user input.

The manipulated or weighted latent space data can be fed to a decoder neural network configured to generate 15 the synthetic channel data based on the manipulated or weighted wireless channel data.

The generated synthetic wireless channel data can comprise channel attributes of physical characteristics of a wireless communication channel. The synthetic wireless channel data can be used to simulate a real world wireless communication channel.

The synthetic wireless channel data can be generated 15 based on a neural network algorithm executed by a trainable neural network.

The method 10 can comprise the further optional step of: detecting 13 channel attributes in the wireless channel data.

A corresponding system for generating synthetic wireless channel data may comprise: means for proving wireless channel data in a latent space, wherein the wireless channel data comprises a plurality of datasets, wherein each dataset represents channel characteristics of a wireless communication channel and comprises a plurality of channel attributes; an interface configured to receive a user input which defines at least one channel attribute; a processing unit configured to mutate the wireless channel data, wherein during said mutation only channel attributes of wireless channel data other than the at least one channel attribute defined by the user input are allowed to mutate; wherein the processing unit is configured to generate synthetic wireless channel data based on the mutated wireless channel data in latent space.

Another possible system for generating channel data can comprises: a user interface and a processing unit, wherein the user interface is configured to receive a channel attribute from a user and forward said channel attributes to the processing unit, wherein the processing unit is configured to convert the user input into manipulation of latent space data resulting in synthetic data based on the latent space data, wherein the synthetic data is conform with the inputted attribute.

Figure 2:
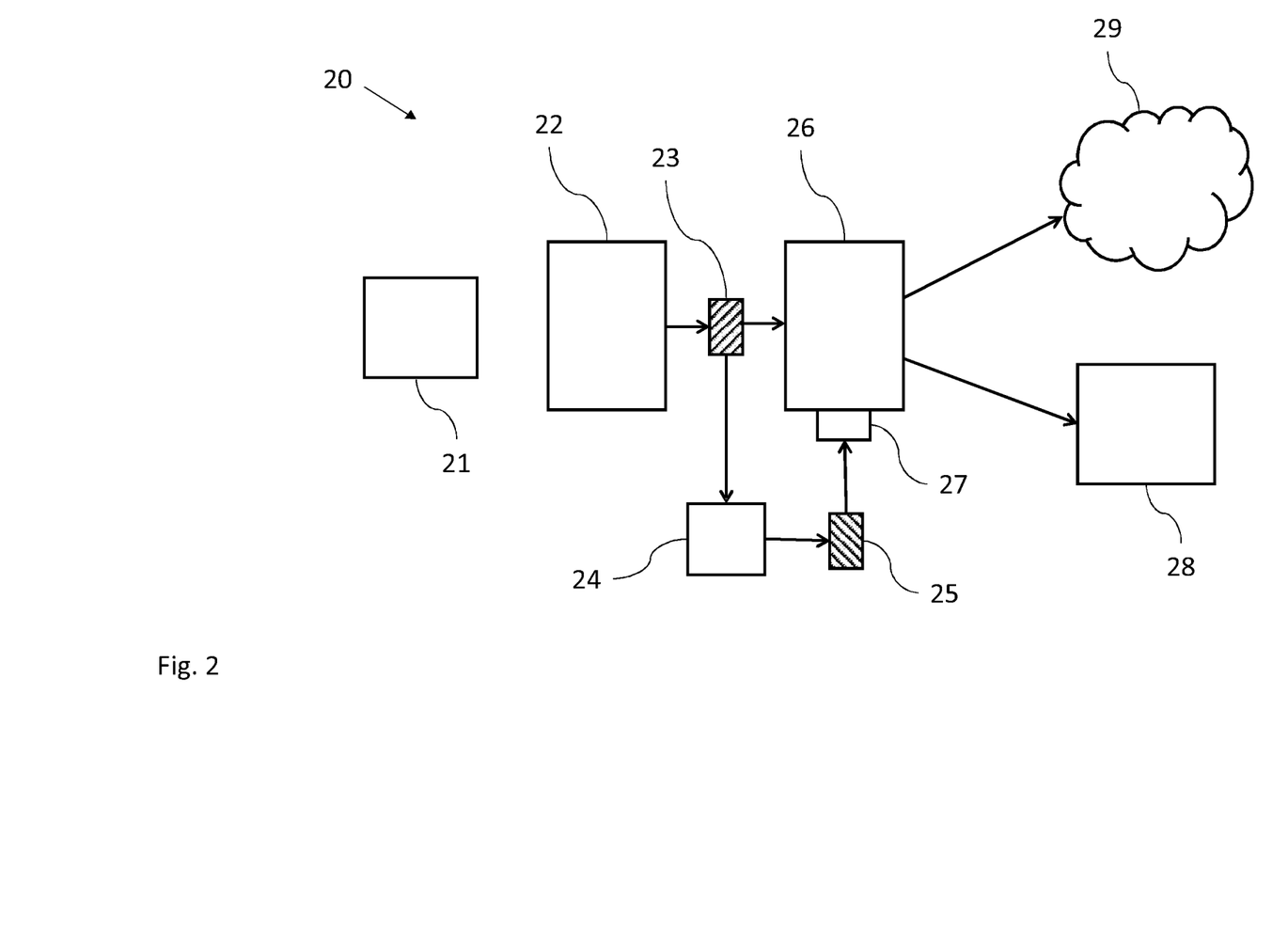
FIG. 2 shows a system for generating synthetic wireless channel data according to an embodiment.

FIG. 2 shows a schematic diagram of a system 20 for generating synthetic wireless channel data according to yet another embodiment.

The system 20 comprises: a user input means 21 and a processing unit 24, wherein the system 20 is configured to receive channel attributes from a user and to forward said attributes to the processing unit 24, wherein said processing unit 24 is configured to execute an algorithm to generate synthetic channel data based on the inputted channel attributes. Said algorithm is trained with training data which comprises channel data and channel attribute data Such a system 20 allows deriving synthetic generated (wireless) channel data from measured data, e.g., measured with drive tests. To be flexible, the synthetic data generation can be adjusted or manipulated to generate specific environmental circumstances.

Usually, channel measurement campaigns are driven for a specific frequency (e.g., 2 GHz or 28 GHZ). For example, a user who wants to "replay" a measurement in lab may have to restrict to a specific frequency. However, the system 20 allows machine learning based manipulation, wherein a mixture of different frequencies can be supported. In principle, any RF signal can be generated in the lab. Thus, a high flexibility for generating channel sounding data without performing drive tests can be provided and data can be generated fast.

The system 20 can from an AI channel simulator with adjustable data generation unit.

For instance, during the generation of the synthetic channel data only channel attributes other than the attributes received from the user are changed. In other words, the generated synthetic channel data always has the channel attributes which were received from the user, while other channel attributes may vary.

The algorithm makes use of latent space data on the basis of which the synthetic channel data is generated.

In particular, the user input can control the manipulation of latent space data via the user input means 21. The user input means 21 can comprise a scroll bar, slide controller, a wheel, or a switch, button. The user input means 21 can father comprise a graphical user interface. For instance, a digital slide controller can be displayed in the graphical user interface.

The channel attribute can be at least one out of the following: frequency band, outdoor/indoor, UMi/UMa, NLOS/LOS, static mobility, Doppler frequency, velocity, humidity, temperature, interference, rain, jammer, spoofer, position data.

The training data can comprise measured channel data.

The system 20 can comprise an encoder neural network 22. The encoder neural network 22 can be comprised by the processing unit 24.

The training of the algorithm can comprise at least the use of an encoder neural network 22 transforming inputted data in a latent space, i.e. in latent space data 23.

The training of the algorithm may comprise at least a step for identifying channel attributes in latent space in relation to inputted attributes. Preferably, each dimension in latent space represents an attribute from inputted data.

The identification of channel attributes in latent space can be based on a Forced Disentanglement or a Mean Latent Bias algorithm.

The training of the algorithm may comprise an identification of at least one attribute in latent space 23 representing inputted attribute data.

For example, dimensions of the latent space 23 may represent parameters of a measurement data, e.g. of measurement data on the basis of which the latent space 23 was generated.

The user input can comprise a sequence of channel attributes, e.g., a dynamic scenario based on parameter sequences over time.

The system 20, in particular the processor 24, can be configured to weight or manipulate the at least one identified attribute in latent space based on the inputted channel attributes.

The system can further comprise a decoder neural network 26. The decoder neural network 26 can also be a trained neural network. The manipulated or weighted latent space data 25 can be fed to the decoder neural network 26, e.g. via an interface 27. The decoder neural network 26 can be configured to output the synthetic channel data based on this latent space data 25.

The latent space data 25 that is fed to the decoder neural network 26 (i.e., decoder input data 26) can be generated by:
analyzing latent space data 23 generated by the encoder neural network 22, e.g. generated based on training data during a training routine;
detecting correlations between the training data (e.g. a digital dataset) and the latent space data; and
generating the decoder input data 25 based on the detected correlation.

Thereby, the processing unit 24 can be configured to generate the decoder input data 25 by superimposing random or pseudorandom data with information based on the detected correlations and further manipulating the thus generated data 25 based on the channel attributes received via the user input. Thus, large datasets of wireless channel data with specific channel attributes, i.e. specific constraints defined by the user input, can be generated based on a limited number of training datasets.

In other words: the encoder input data 25 can not only be generated based on pseudo random or random data. Instead, at least one channel attribute that has to be fulfilled by the synthetic data is determined based on the user input. The user input can be received via graphical user interfaces, e.g. a virtual scroll bar, wheel, switch, button, or position in a map. The user input represents/defines channel attributes that have to be fulfilled by the synthetic data. The user input can, thus, be converted in a manipulation of latent space data (compressed representation) and fed to the decoder 26 with the goal of getting synthetic data according to the constraints defined by the user input.

In a special embodiment, the user input is input position data. Thereby, the position data is converted to environment data using map data (e.g., a digital map and extract object data with position, size . . . ) for input and for training.

A disentanglement algorithm can be used on the latent space data to determine correlations between channel attributes in training data and channel attributes in the latent space data (compressed representation).

The user input can be part of a signal generator or transmitter user input, which is received by the system 20 on the input means 21.

The system 20 can comprise or form a signal generator 28. The generated synthetic channel data can be outputted by means of this signal generator 28, preferably combined with an RF signal and/or with a transmitter representing signal. In particular, the RF signal can be a signal representing a transmitter signal multiplied with channel data, the RF signal can be an output of data representing a transmitter signal multiplied with channel data.

The processing unit 24 can be configured to encrypt the generated synthetic channel data. Such encryption can protect against not authorized or not paid use. A payment system including a decryption of the data, if buying a key, can be foreseen.

The user input can be part of a receiver or a signal/spectrum analyzer. The generated synthetic channel data can be processed with a received signal and forwarded to a processing unit of, e.g., a spectrum analyzer.

The system can further be connected to a communication network 29, e.g. the internet. The user input can be provided from a server connected via a network connection. For instance, the system 20 can comprise a communication interface for connecting to the communication network 29. The communication interface can be a component of the input means 21, or the input means 21 can form a component of the communication interface.

In particular, the generated synthetic channel data is downloadable via the communication network. Preferably, single channel data can be downloaded via the communication network. However, it is also possible that an RF signal multiplied with a channel data can be downloaded. E.g., the RF signal was uploaded beforehand.

In one example, the training of the algorithm is performed on a server connected via the communication network 29.

In particular, the training data can be uploadable to such a network server.

Figure 3:
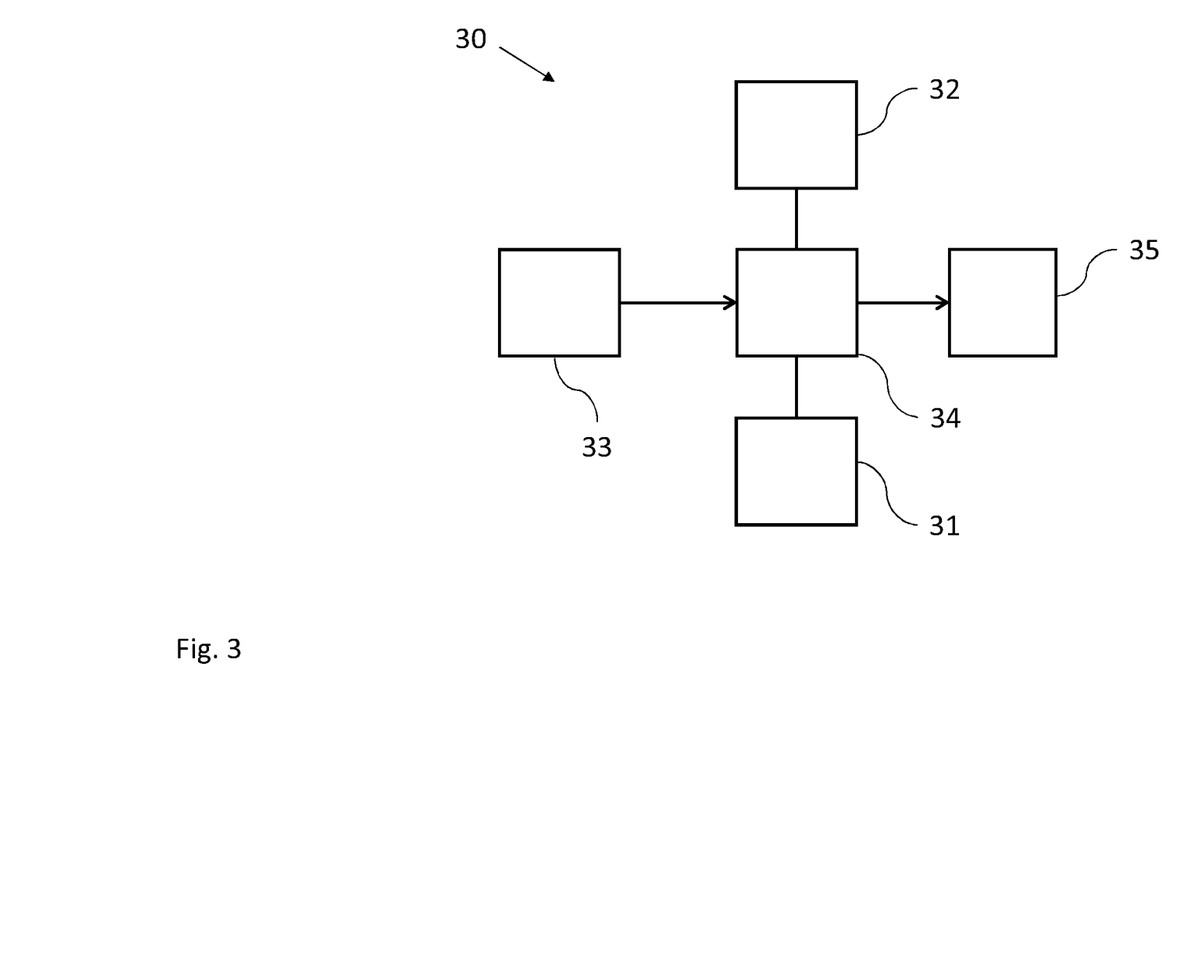
FIG. 3 shows a system for generating synthetic wireless channel data according to an embodiment.

FIG. 3 shows a system 30 for generating synthetic wireless channel data, in particular location dependent channel data, according to a further embodiment.

The system 30 comprises a database 31 configured to store a plurality of wireless channel datasets and/or an artificial intelligence unit 32 trained with such wireless channel datasets, a user interface 33 configured to receive user input defining at least two geographic positions, a processing unit 34 configured to synthesize estimated channel characteristics of a wireless communication channel between the at least two geographic locations either based on the datasets stored in the database 31 and/or by inputting the at least two geographic positions into the artificial intelligence unit 32, wherein the system 30 is configured to output a synthetic wireless channel dataset which comprises channel attributes of physical characteristics of a wireless communication channel.

The system 30 may further comprise an interface 35 for outputting the synthetic wireless channel dataset.

The processing unit 34 can be configured to generate the synthetic wireless channel datasets at least partially based on the estimated channel characteristics. For example, the processing unit 34 is configured to estimate physical objects within an area of interest between the at least two geographic positions based on geo location information, wherein the processing unit 34 is further configured to take said physical objects into account when synthesizing the estimated channel characteristics.

For example, the geo location information can be stored in the database 31 or provided by the artificial intelligence unit 32.

The information on the physical objects can be generated with a trained algorithm, which can be executed by the artificial intelligence unit 32. The generated information can be stored in the database.

The algorithm can be trained with the use of measured channel data, for example comprising position information and/or map data. For example, the measured channel data was measured by a channel sounding technique.

Channel sounding is a technique that evaluates the radio environment for wireless communication. Because of the effect of terrain and obstacles, wireless signals propagate in multiple paths (the multipath effect). To minimize or use the multipath effect, channel sounding can be used to process the multidimensional spatial-temporal signal and estimate channel characteristics. This facilitates simulation and design of wireless system.

A corresponding method for generating synthetic wireless channel data, may comprise the steps of:
  storing a plurality of wireless channel datasets in a database, and/or training an artificial intelligence unit with such wireless channel datasets;
  receiving user input defining at least two geographic positions,
  synthesizing estimated channel characteristics of a wireless communication channel between the at least two geographic locations either based on the datasets stored in the database or by inputting the at least two geographic positions into the artificial intelligence unit,
  outputting a synthetic wireless channel dataset which comprises channel attributes of physical characteristics of a wireless communication channel.

Figure 4:
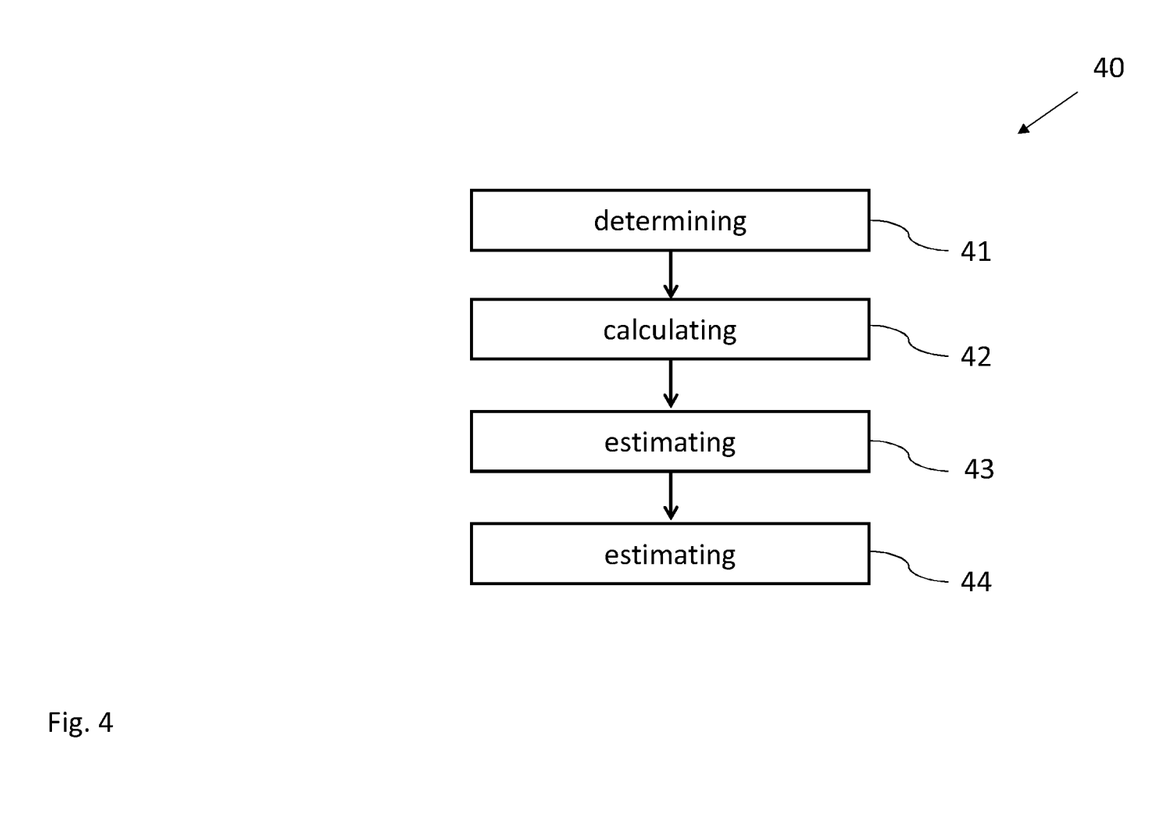
FIG. 4 shows a flow chart of a channel simulation method according to an embodiment.

FIG. 4 shows a flow chart of a channel simulation method 40 according to another embodiment.

The channel simulation method 40 comprises the steps of:
  determining 41 the position of a first point and of a second point, wherein geo location information is used for determining the positions;
  calculating 42 an area of interest between the first point and the second point;
  estimating 43 physical objects within the area of interest between the first point and the second point based on the geo location information; and
  estimating 44 channel information based on physical objects determined from the geo location information and a database correlated to the physical objects.

The estimated channel information can comprise channel characteristics. The channel information can be estimated 44 in the form of a synthetic wireless channel dataset which comprises channel attributes of physical characteristics of a wireless communication channel. The wireless communication channel can be a millimeter wave channel. In particular, the wireless communication channel can be a communication channel according to the 3G, 4G, 5G or 6G standard.

The first point can be a reference point and the second point can be a simulation point, i.e. a simulated point. For example, the reference point is a fixed or movable reference point. The channel information can be estimated for a channel between the first and the second point.

The position can be determined 41 by a user input, by selection on a map and/or by inputting of GPS data. For example, the user input can be provided on a user interface, such as a GUI. The GUI can comprise virtual control elements, such as a virtual slider.

The geo location information can comprise maps or map data which contain information on obstacles heights, e.g. information on buildings. The geo location data can comprise GNSS data.

The first and/or the second position can be geographic map position data. Alternatively, the first and/or second position can be virtual positions on a map.

The area of interest can at least partially be calculated based on manual settings, such as height, width, and/or Fresnel zone. These settings can be inputted by the user interface.

The information about physical objects within the database 31 can be estimated 43 by a trained algorithm. For example, the trained algorithm can generate respective channel data based on map object data, contained in the channel relevant area (area of interest) and defined by at least the first and the second point (reference point and the simulation point).

For example, the map object data describes at least relative position to at least one of the points (reference/simulation), the size and at least one information regarding the shape of an object.

Training of the algorithm can be performed with measured data including map object data in the respective channel relevant environment (channel sounding).

The algorithm can be trained with use of measured channel data, which can comprise a position information and/or map information. For example, a modeling method can be used that combines statistical modeling and deterministic modeling with channel attributes extracted from channel data.

The map information can be on the environment of the two points (reference position/point and the simulation). Therefore, a database can contain information about real objects with abilities regarding the channel behavior.

The abilities may comprise information about how the geometries of objects can influence a radio channel between two points on a map. The geometries can comprise: distance between first point and/or second point, position, height, material, temperature, weather conditions, moisture.

The method 40 can be based on at least one of the following: an interpolation of at least two measured channel data; a Generative Adverserial Network (GAN); and/or at least one neural network using at least parts of map data and measured channel data for training.

The parts of map data can be in a maximum granularity of a single object in the map.

Each object can be evaluated by the algorithm with regard to distance, angle to the first point or the second point, as wells as an orthogonal reflection surface.

The map data can comprise information on at least one out of following: altitude, landscape, near object, urban environment, country, environment, traffic, layout of a road, flat or mountain landscape, buildings, weather, temperature.

The method 40 can further comprise the step of calculating channel information based on a movement. E.g., for a channel with at least one moving endpoint.

IF a mobile device and/or a spreaders move, the following dependencies may arise:
  The channel transfer function becomes additionally time-dependent.
  The time dependency can also be represented as a location dependency (with respect to a mobile station).
  With the speed of movement (mobile station and/or scattered), Doppler shifts of the receive frequencies arise.

In particular, for a channel transfer function $C(a)$ this can have the consequence that it becomes multidimensional: Thus, $C(a)$ becomes $C(w, t)$ or $C(w,x)$, where, strictly speaking, the parameter a should not be used anymore because the transmitter frequency and the receiver frequency differ due to the Doppler shift. In practice, however, transmitter frequency Qc and Doppler frequency ap are very far apart (Qc>ap), so that the receive frequency is only very slightly different from the transmit frequency.

Thus, based on the system 30 and method 40 above, a user can choose a location specific map model, based on GNSS data (e.g., by imputing of coordinates or selection on a map). By specifying a route respectively a plurality of points und a type of movement, the user can receive a channel that changes over time. The user can input further parameters about the surroundings or environment, such that these parameters are considered when generating the channel model.

By means of measured data (channel sounding), a channel can be measured on a specific location and can be linked to GNSS data as well as further information about the environment (e.g., distance and geometry of the surrounding buildings) or environmental information (e.g., weather). With this data, a machine learning algorithm can train an adversarial neural network. This neural network can subsequently be used to generate new channel for new locations or parameter. Hence, the user receives a realistic channel mode for all locations and can perform further simulations to investigate influences by the environment or surroundings.

Thus, the above system 30 and method 40 provide a new way to generate synthetic "real world data".

Figure 5:
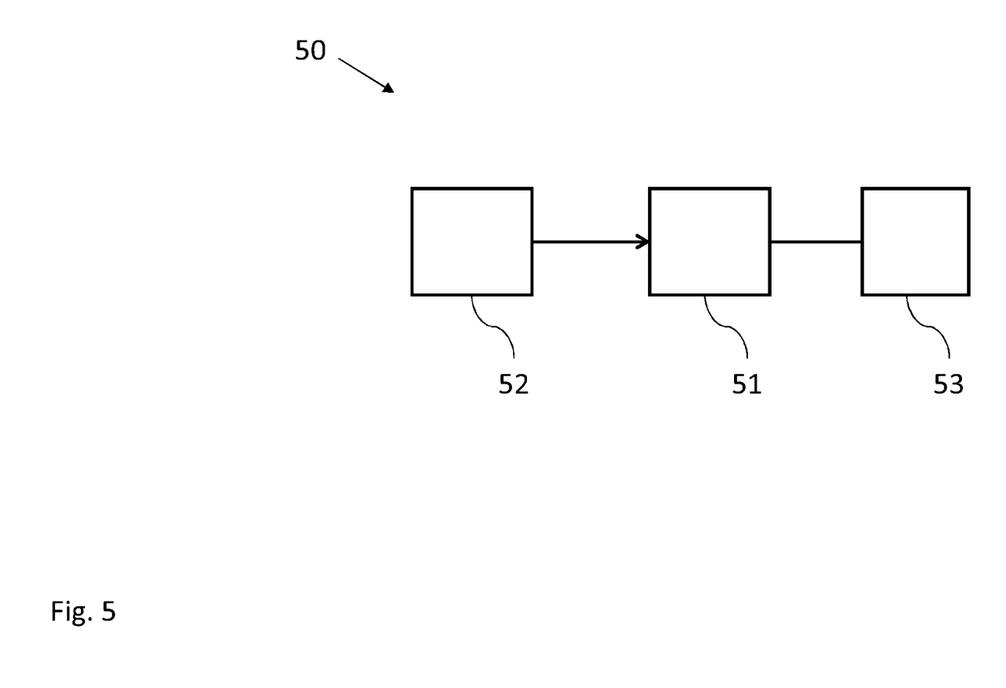
FIG. 5 shows a channel simulation system according to an embodiment.

FIG. 5 shows a schematic diagram of a channel simulation system 50 according to an embodiment. The system 50 can be a map-abed channel simulator, e.g. for 4G, 5G or 6G channel sounding.

The channel simulation system 50 comprises a processing unit 51 which is configured to execute the method 40 shown in FIG. 4.

The channel simulation system 50 can further comprise a user interface 52 configured to receive a user input. For example, the user interface allows to manually add additional object data in a channel relevant environment.

The user interface can comprise a graphical user interface. For instance, the graphical user interface can be configured to display an interactive UI element such as a virtual slider.

The system 50 can further comprise a database and/or an artificial intelligence unit 53 which can be configured to execute the trained algorithm.

The processing unit 51 can be configured to output channel data, in particular a synthetic wireless channel dataset which was determined based on the channel simulation method 40.

The channel simulation method 40 shown in FIG. 4 can also be carried out by the system 30 shown in FIG. 3 or by the system 20 shown in FIG. 2.

A further possible method for generating synthetic channel data comprises the following steps:
  inputting of position data on two positions (reference position and simulation position), for generating synthetic data for this positions;
  conversion of position data in channel relevant environment data, wherein channel relevant environment data is map data including map objects in a specified region (e.g., Fresnel zone or approximation) determined by the two position data;
  wherein channel relevant environment includes at least position of map objects and size of map objects, and wherein channel relevant environment data is used as attribute for channel data.

Additionally, a channel simulation unit based on input of position data is possible without latent space and decoder and encoder but with a traditional algorithm that searches in a database with measured dataset including channel data, and respective environment data for the most similar environment.

Additionally, a user input of attributes should be possible, e.g. with a manual sketched channel impulse response graph that is converted to attributes for both solutions (latent space encoder and decoder, and classic parameterization).

Figure 6:
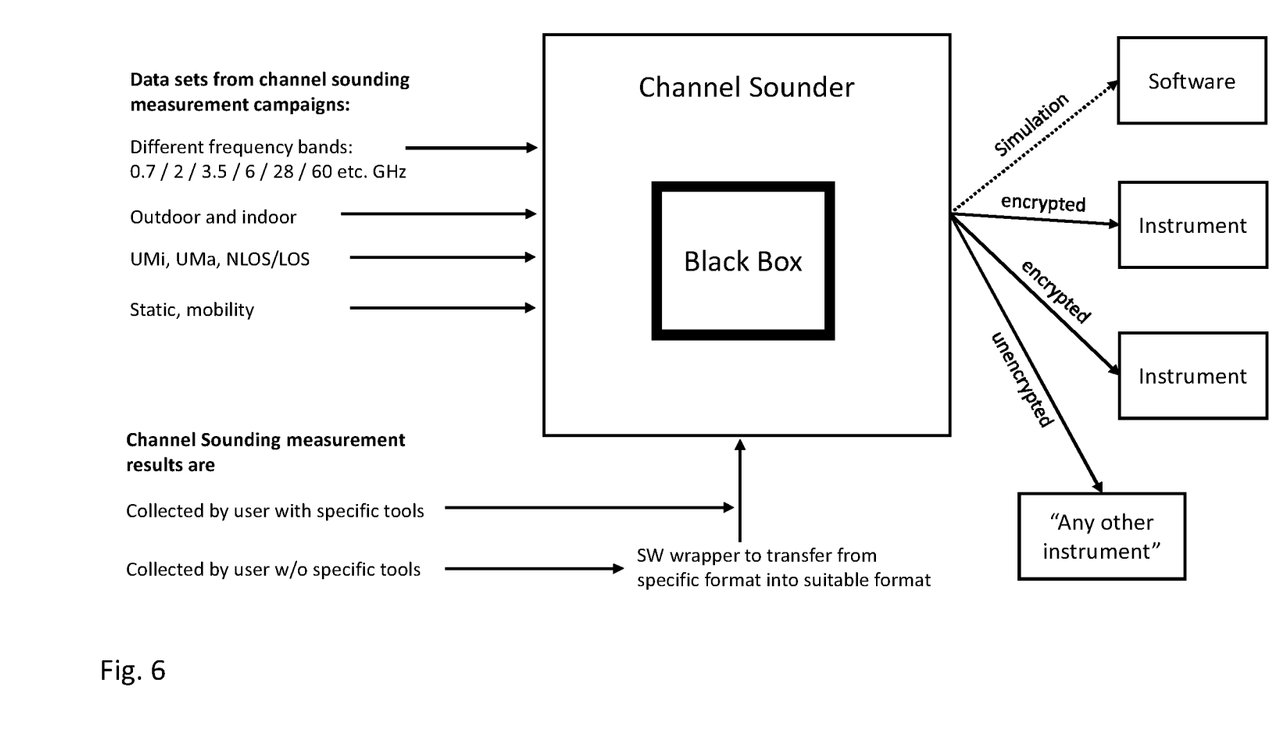
FIG. 6 shows a system according to an embodiment.

FIG. 6 shows a system according to an embodiment. The system can form a map-based channel generator, e.g., for 6G channel sounding.

In the following, further aspects and advantages of the above systems and methods are discussed:

The characteristics of a wireless communication channel, e.g. a radio channel, have a significant influence on the effort required for digital transmission. A radio channel is characterized by:
  Decrease of the received field strength with distance
  Echoes due to multipath propagation caused by reflections
  Doppler shifts of the received frequency due to movement of transmitter, receiver, reflector, etc.
  Interference by other radio signals or other electromagnetic disturbances
  Interference by additive Gaussian noise.

Knowledge of the characteristics of the radio channel is therefore important for dimensioning a digital radio transmission.

For instance, in digital mobile radio and digital broadcasting, a radio signal may suffer (additional) attenuation and reflections by the terrain, buildings and other obstacles. Reflections result in additional received signals, which arrive after the main signal and thus cause interference. The movement of a mobile device may further causes a Doppler shift of the received or transmit signal.

With the above methods and systems, in particular with the systems 30, 50 and method 40, a user can select a channel model specific to a location on the basis of GNSS data (e.g., by entering the coordinates or by marking on a map).

By specifying a route or several points and the mode of travel, the user can receives a time-varying channel. If necessary, the user can specify further parameters of the environment or surroundings in order to have these also included in the generated channel model.

By means of recorded data (channel sounding), the channel can be measured at a location and linked with the GNSS data and, if necessary, further information on the environment (e.g. distance and geometry of surrounding buildings) or environment (e.g. weather). With this data, an adversarial neural network can be trained by machine learning and then used to generate new channels for new locations or parameters.

Thereby, an AI algorithm can examine existing measurement data with corresponding real maps. It can extract the buildings, elevations, trees, etc. present on the real maps and determine on this basis what influence real objects have on the channel. The basis for this estimation can be measurement data fed to the system in advance.

By repeating a measurement several times, the algorithm can create project attributes for individual buildings or other objects, which can then be linked to virtual maps. Conditions such as weather, temperature, humidity, etc. can also be taken into account.

The user can thus receive a realistic channel model for all locations and can, if necessary, investigate further influences by the surroundings and the environment in simulations.

The above techniques can, for instance, be used for automated positioning of radio masts or other transmitting or receiving stations. Similar to contour lines, radio strength distributions or heat maps can be generated.

The trainable algorithms described above can be machine learning algorithms. For the machine learning algorithm the following approaches can be used: Mechanical learning can be divided into three methods: Supervised Learning, Unsupervised Learning and Reinforcement Learning. Deep Learning is a special form of Machine Learning. For the above system 20, typically supervised or semi-supervised machine learning would be used.

Supervised machine learning uses known data to identify patterns and relationships. The algorithm learns the patterns using a training data set (sample data). Supervised learning always learns the relationship to a target variable and tries to predict it correctly. The target variable can be a class (e.g. termination yes/no) or a numerical value (e.g. turnover for the next month).

Semi-supervised machine learning uses both sample data with concrete target variables and unknown data and is, thus, a mixture of supervised and unsupervised learning. The application areas of semi-supervised learning are basically the same as for supervised learning. The difference is that only a small amount of data with a known target variable is used for the learning process and a large amount where this target variable is not yet present. This has the advantage that training can already be done with a smaller amount of known data. This is because the acquisition of known sample data is often extremely time-consuming and cost intensive, since humans often have to create this data through manual processes (e.g., the manual labeling of images). Especially in image or object recognition, semi-supervised learning finds application. Here, a small dataset of known (labeled) images is created, this is usually done by humans. Subsequently, for example, an artificial neural network is trained for classification and then applied to the rest of the data. This way, the sample data for the unknown data can be created correctly much faster.

In the following, more information is provided on the disentanglement algorithm that can be used to manipulate, in particular mutate, wireless channel data in latent space. In particular, a possible way of identification of dimension in latent space belonging to a certain attributes or correlation of attribute to compressed representation is shown:

A. Mean Latent Bias

The first proposed method is based on the idea, where the different features of the input data, also called generative factors, are interpreted as biases in the latent space. Since the features are not explicitly considered as such during the learning phase, there is no clustering in specific areas for the different features and the inputs are scattered according to the standard normal distribution. The assumption is though that there is still some bias for the generative factors, which can be exploited for the case of generating certain features. A mean latent vector $\mu_k$ can be used for the generation of new samples, where $\mu_k$ is the average over all latent representations of samples having the same feature k. This can be formulated as $$\mu_k = \frac{1}{N_k} \sum_i \lambda_k(x_i) \cdot T(x_i),$$

where $\lambda_k$ is the characteristic annotation function of the k-th attribute, i.e., $$\lambda_k(x_i) = \begin{cases} 1 & \text{if } x_i \text{ has attribute } k \\ 0 & \text{otherwise} \end{cases} \text{ and } N_k = \sum_i \lambda_k(x_i).$$

These mean latent vectors were used to change the input data. In the following, they are used to generate new data. This is done by drawing a sample from the distribution $p_{Z,\sigma_T}$ and adding the mean value $\mu_k$ of the given attribute k. This results in a new sampling distribution $$Z' \sim (\alpha \mu_k, \sigma_T^2 I_n),$$

where $\alpha$ denotes some factor for the mean latent vectors $\mu_k$. In addition to generation, the mean latent vectors can also be used for the manipulation of data. Let us assume $z_i = T(x_i)$ is the latent representation of an input $x_i$ which has a certain feature k, i.e., $\lambda_k(x_i)=1$. The latent representation $z_i$ can then be split into the sum of two vectors $$z_i = \mu_k + v,$$

where $v$ is called style vector and $\mu_k$ is the mean latent vector of the k-th attribute. So when changing the generative factor of the input $x_i$, the style vector $v$ can be added to a different mean latent vector $\mu_l$ $$\begin{aligned} z_i' &= \mu_\ell + \beta v \\ &= \mu_\ell + \beta(z_i - \mu_k), \end{aligned}$$

where $\beta>0$ can be some factor for the style vector. If the new latent representation is passed through the inverse NF $T^{-1}$, a new attribute is added to the input $$x_i' = T^{-1}(\mu_\ell + \beta(T(x_i) - \mu_k)).$$

B. Forced Disentanglement

Our second method uses the concept of disentanglement in the latent space. Disentanglement describes the property, that changing one variable in the latent space changes exactly one feature in the original space. In the case of the standard normal distribution $N(0, I_n)$, the respective latent variables $Z_i$ are independent to each other, but do not represent only one single characteristic at a time.

Various approaches to VAE attempt to disentangle the different attributes. The different methods can be grouped into two classes. The first group tries to disentangle the generative factors using an unsupervised learning approach, whereas the second kind of methods use labeled data to decouple the attributes. This was achieved by introducing a condition on the distribution of some of the latent variables Zi. We only discuss this second kind of disentanglement.

Assuming that the realization c of the random variable C-describing the features of the CIR (channel impulse response, which one example for data defining a wireless communication channel) is known for each input data, in contrary to A., the conditional density $q_{X|C}$ can also be estimated directly using the NF.

An approach splits the latent space into two groups [z, c] with $c \in \mathbb{R}^d$, $z \in \mathbb{R}^{n-d}$ such that $[z, c] = T(x) = [T_z(x), T_c(x)]$ and the drawback direction being $x = T^{-1}([z, c])$. The conditional probability $q_{X|C}(x|c)$ is directly optimized. This is done by interpreting $T_c(x)$ as an approximation of the realization c of C with $$T_c(x)=c+\eta=v, \; v\sim N(c,\epsilon^2 I).$$

wherein $\eta$ is some noise with a relatively small $\epsilon$. The logarithm of the conditional probability $q_{X|C}(x|c)$ can then be expressed by $$\log q_{X|C}(x|c)=\log|\det J_T(x)|+\log p_Z(z)+\log p_\eta(\eta),$$

where $\eta \sim p_\eta(\eta)$, which is equal with $N(0,\epsilon^2 I)$. The purpose of this method is that once the training is done, it is possible to infer the features c of the new data by processing it through the NF and analyzing $T_c(x)$.

To use this property, the conditions c of the NF need to be the generative factors of the input set. If c is coded as a one-hot vector, it is the similar to vector of annotations $\lambda_k(x_i)$ from the previous method.

For small $\epsilon$ the overlap of the normal distributions for the different c can be neglected. Hence, in $v$ the generative factors are disentangled and the different groups appear as separable clusters. With this setup there are two ways to proceed for the generation of new samples of the input distribution. A first way is to draw samples from the normal distributions $p_Z$ and $p_{v|c}$ for a given c, using the temperature standard deviation $\sigma_T$, respectively, and calculate new samples as $$x_i=T^{-1}([z_i,v_i]).$$

An alternative is to use the mean latent vectors $\mu_k$ to find new samples the same way as before (A.). Hence, samples are drawn from the normal distributions $p_Z$ and $p_\eta$, where the features c are set to zero. The generation is then equal $$x_i=T^{-1}([z_i,\eta_i]+\alpha\mu_k),$$

where $\alpha$ is again some factor for the mean latent vector $\mu_k$.

The main advantage of the disentangled latent space comes into play when changing the input data according to some attributes. Let us denote by $e_k \in \mathbb{R}^d$ the unit vector which has a 1 at position k and 0 otherwise. If an input needs to be changed from attribute k to attribute l, the conditioning vector c can be adjusted using the unit vectors $e_k$ and $e_l$ If the condition vector c is coded as a one-hot vector, this is done by $$c'=c-e_k+e_l.$$

Using the conditional NF the whole manipulation can be formulated as $$x_i'=T^{-1}([T_z(x_i), T_c(x_i)-e_k+e_l]),$$

where Tz and Tc are the two forward mappings $T(\bullet)=[T_z(\bullet), T_c(\bullet)]$.

Since the split of the latent space vectors into two parts can be done arbitrarily, we can define two disentanglement methods. First the simple disentanglement sets the number of disentangled dimensions d to be the number of different features present in the input data set. In the case of the fully disentanglement we will condition all latent dimensions on one of the input features resulting in d=n.

All features of all embodiments described, shown herein can be combined with each other.

The invention claimed is:

1. A method for generating synthetic wireless channel data, comprising:
providing wireless channel data in a latent space, wherein the wireless channel data comprises a plurality of datasets, wherein each dataset represents channel characteristics of a wireless communication channel and comprises a plurality of channel attributes;
receiving a user input;
mutating the wireless channel data, wherein during said mutation the user input is used as a mutation parameter, and
generating synthetic wireless channel data based on the mutated wireless channel data in latent space.

2. The method of claim 1,
wherein the user input comprises and/or defines a sequence of channel attributes.

3. The method of claim 1,
wherein the synthetic wireless channel data is generated based on a neural network algorithm executed by a trainable neural network.

4. The method of claim 3,
wherein the neural network algorithm is trained with training data which comprises channel data and channel attribute data.

5. The method of claim 3,
wherein the training of the neural network algorithm at least comprises the use of an encoder neural network transforming an inputted dataset to latent space data.

6. The method of claim 5,
wherein the training of the neural network algorithm contains at least a step of: identifying channel attributes in the latent space data in relation to channel attributes of the training data and/or inputted channel attribute data.

7. The method of claim 5,
wherein the training of the neural network algorithm contains the identification of at least one channel attribute in the latent space data representing a channel attribute of the training data and/or the inputted channel attribute data.

8. The method of claim 1, comprising the further step of: detecting channel attributes in the wireless channel data.

9. The method of claim 8,
wherein the wireless channel data is mutated in latent space by manipulating or weighting at least one detected channel attribute in the wireless channel data based on the at least one channel attribute defined by the user input.

10. The method of claim 9,
wherein the manipulated or weighted latent space data is fed to a decoder neural network configured to generate the synthetic channel data based on the manipulated or weighted wireless channel data.

11. The method of claim 1,
wherein the at least one attribute defined by the user input is at least one of: frequency band, outdoor or indoor location, urban micro/urban macro, i.e. UMi/UMa, non-line-of-sight/line-of-sight, i.e. NLOS/LOS, static mobility, Doppler frequency, velocity, humidity, temperature, interference, rain information, jammer, spoofer, position data, environment data.

12. The method of claim 1,
wherein the at least one attribute defined by the user input geographically defines said wireless communication channel.

13. The method of claim 1,
wherein the generating synthetic wireless channel data is encrypted.

14. The method of claim 1,
wherein the user input is received from a receiver, a signal analyzer, or a spectrum analyzer.

15. The method of claim 1,
wherein the user input is received on a user interface, in particular graphical user interface.

16. The method of claim 1,
wherein the user input is received on an interface that is connected to a communication network, in particular the internet.

17. The method of claim 16,
wherein the user input is provided from a server via the communication network.

18. The method of claim 16,
wherein the generated synthetic channel data is downloadable via the communication network.

19. A system for generating synthetic wireless channel data, comprising:
- means for proving wireless channel data in a latent space, wherein the wireless channel data comprises a plurality of datasets, wherein each dataset represents channel characteristics of a wireless communication channel and comprises a plurality of channel attributes;
- an interface configured to receive a user input which defines at least one channel attribute; and
- a processing unit configured to mutate the wireless channel data, wherein during said mutation only channel attributes of wireless channel data other than the at least one channel attribute defined by the user input are allowed to mutate;
- wherein the processing unit is configured to generate synthetic wireless channel data based on the mutated wireless channel data in latent space.

20. A system for generating synthetic wireless channel data, comprising:
- a database configured to store a plurality of wireless channel datasets and/or an artificial intelligence unit trained with such wireless channel datasets,
- a user interface configured to receive user input defining at least two geographic positions, and
- a processing unit configured to synthesize estimated channel characteristics of a wireless communication channel as geographically defined, either based on the datasets stored in the database or by inputting the at least two geographic positions into the artificial intelligence unit,
- wherein the system is configured to output a synthetic wireless channel dataset which comprises channel attributes of physical characteristics of a wireless communication channel.

21. The system of claim 20,
wherein the processing unit is configured to generate the synthetic wireless channel datasets at least partially based on the estimated channel characteristics.

22. The system of claim 20,
wherein the processing unit is configured to estimate physical objects within an area of interest between the at least two geographic positions based on geo location information, wherein the processor is configured to take said physical objects into account when synthesizing the estimated channel characteristics.

23. The system of claim 22,
wherein the processing unit is configured to calculate the area of interest at least partially based on manually input geographic data.

24. The system of claim 22,
wherein the information on the physical objects is generated with a trained algorithm, which is executed by the artificial intelligence unit.

25. The system of claim 24,
wherein the algorithm is trained with the use of measured channel data.

26. The system of claim 24,
wherein the artificial intelligence unit comprises a trainable neural network which is configured to use at least parts of the measured channel data, in particular at least parts of the map data, for training.

* * * * *